United States Patent [19]
Watson

[11] Patent Number: 5,429,421
[45] Date of Patent: Jul. 4, 1995

[54] HUB FOR A SPOKED WHEEL

[76] Inventor: Paul B. Watson, 412 Fell St., San Francisco, Calif. 94102

[21] Appl. No.: 193,221

[22] Filed: Feb. 8, 1994

[51] Int. Cl.$^6$ .............................................. B60B 1/14
[52] U.S. Cl. ....................................... 301/61; 301/59; 301/110.5
[58] Field of Search ....................... 301/55, 56, 59, 61, 301/104, 110.5

[56] References Cited

U.S. PATENT DOCUMENTS

| | | | |
|---|---|---|---|
| 403,346 | 5/1889 | Harris | 301/61 |
| 612,323 | 10/1898 | Fraser | 301/61 |
| 715,087 | 10/1902 | Krauss | 301/61 |
| 740,287 | 9/1903 | Krauss | 301/61 |
| 742,503 | 10/1903 | Seeds | 301/61 |

FOREIGN PATENT DOCUMENTS

| | | | |
|---|---|---|---|
| 371295 | 1/1907 | France | 301/59 |
| 101532 | 1/1923 | Switzerland | 301/59 |

*Primary Examiner*—Russell D. Stormer
*Attorney, Agent, or Firm*—R. Russel Austin

[57] ABSTRACT

A hub (10) for a spoked wheel includes flanges (18) having a plurality of open-topped slots (20) for receiving spokes (22). The hub is designed for use with spokes having an elongated shaft portion (30) and an enlarged head portion (32). The slots have an open end (25) at a periphery of the flange and an enlarged closed end (27) located between the periphery of the flange and an axis of rotation of the hub. The enlarged end of the slot is wide enough to accommodate the enlarged end portion of the spoke. A narrowest portion (29) of the slot is only wide enough to accommodate the shaft portion of the spoke. Slots in a flange member are arranged in a pattern corresponding to a lacing pattern of spokes in a the wheel. A spoke may be laid into a slot with the enlarged head portion of the spoke in the enlarged portion of the slot, and with the spoke in its correct orientation in the spoke-lacing pattern.

2 Claims, 3 Drawing Sheets

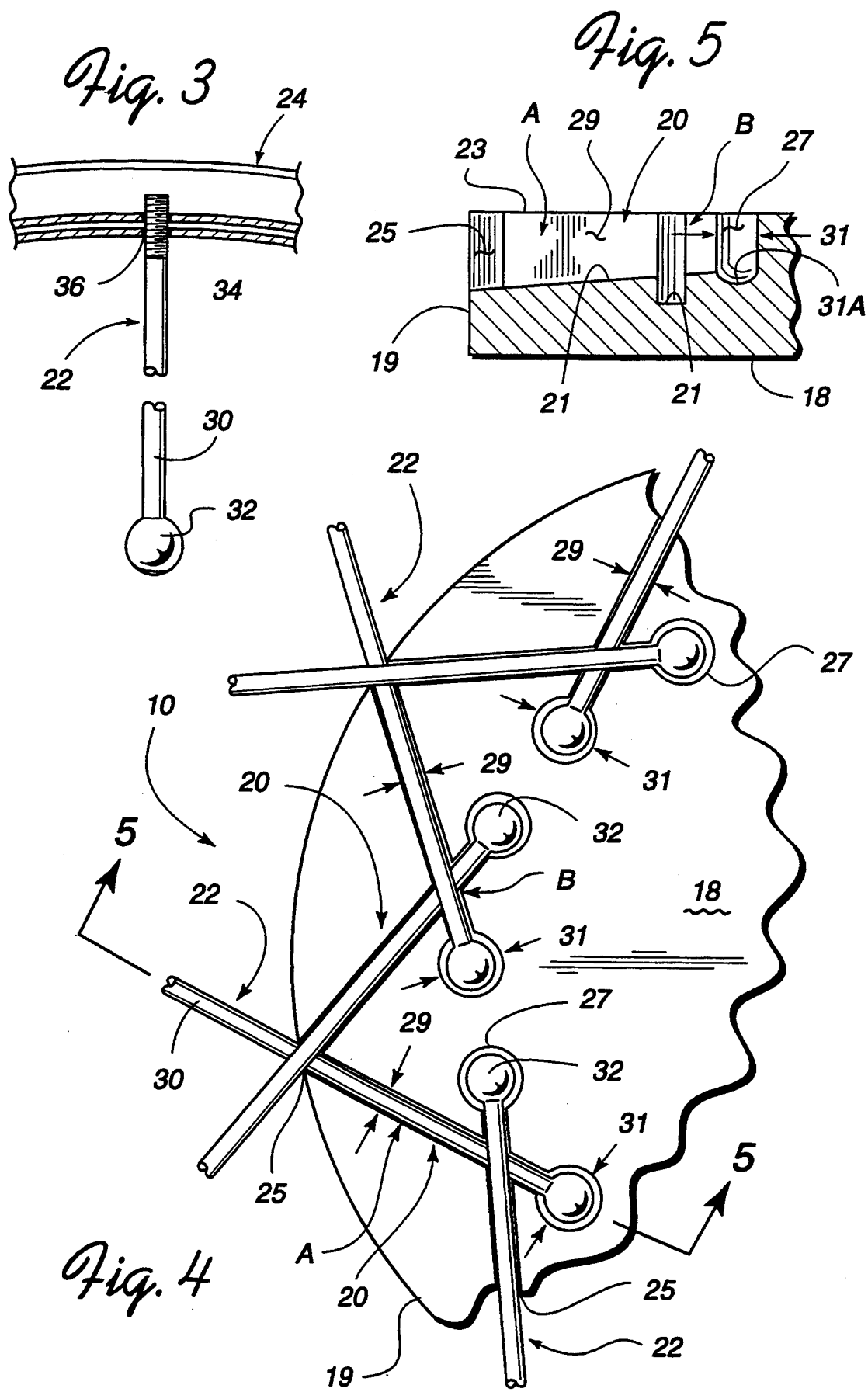

HUB FOR A SPOKED WHEEL

TECHNICAL FIELD OF THE INVENTION

The present invention relates generally to spoked wheels. It relates in particular to a hub having flanges including elongated slots for retaining wheel spokes.

DISCUSSION OF BACKGROUND ART

Bicycle wheels are most often formed from a circular rim attached to a hub by a plurality of wire spokes arranged in a regular pattern. Generally, the spokes are arranged in an intersecting pattern wherein each spoke is about tangential to a circle concentric with the axis of rotation of the wheel. The spokes are passed or "threaded" through holes in hub flanges which lie in a plane generally perpendicular to the axis of rotation. The spokes are retained in the holes by an enlarged head portion. The enlarged head portion is larger than the diameter of the holes. Near the head portion the spoke is bent at right angles so that the spoke may be directed toward the rim. Each spoke has a screw-threaded end which extends through a hole in the rim and is secured therein by a nipple which is screwed onto the threaded end.

Building such spoked wheels is a complicated, time-taking process which requires considerable skill. A builder must be conscious always of the required intersection pattern of the spokes. No matter how much skill is acquired by a wheel builder, threading spokes through holes in hub flanges and locating the correct hole in a rim in which to insert a particular spoke still consumes time. Thus, in the total cost of building a wheel, the cost of labor may be a significant factor.

Machines have been devised to build spoked wheels with minimum involvement of skilled personnel. These machines, however, have been devised to mimic the actions of a human in building the wheel. The machine must perform the complicated function of threading a spoke through a hole in a hub flange, turning the spoke to correctly seat the spoke head in the hole, and directing the threaded end of the spoke, at the correct angle, into the correct hole in the rim. Such wheel building machines are extremely complicated, and thus may be subject to frequent breakdown. The complicated motions and operations required are such that it still takes the best of such machines about fifteen minutes to build a wheel. A skilled wheel builder may build a similar wheel in about one hour. This being the case, building wheels using cheap labor is still a viable option to building wheels by machine.

SUMMARY OF THE INVENTION

The present invention is direct to a hub for a spoked wheel which would simplify machine assembly of such a wheel. The hub would eliminate the complicated spoke threading action required of a wheel building machine, this spoke threading action being a major contributor to the complexity of such machines and a major factor in the relatively low output of such machines.

In one aspect of the present invention, a hub includes an elongated hub body rotatable about an axle inserted therethrough. The axle defines an axis of rotation. At each end of the hub body is a flange member. Each of the flange members is arranged generally transverse to the axis of rotation, with the axis of rotation extending therethrough;

Each flange member includes a plurality of slots therein. Each slot is configured for receiving a spoke, which includes an elongated shaft portion and an enlarged head portion. Each of the slots has a base, an open top, an open end located at a periphery of the flange member, and a closed end between the periphery of the flange member and the axis of rotation. Each of the slots has a width at a narrowest portion thereof sufficient to receive the shaft portion of the spoke but not sufficient to receive the enlarged head portion of the spoke. Proximate the closed end of the slot, the slot has a an enlarged portion having width sufficient to receive the enlarged head portion of the spoke, whereby the spoke may be laid into the slot with the enlarged head portion thereof located at the closed end of the slot.

Typically in a spoked wheel, a hub and a rim are attached to each other by plurality of spokes arranged in a predetermined spoke lacing pattern. The rim includes a plurality of equispaced holes each thereof for receiving a spoke. Each spoke includes an elongated shaft portion, an enlarged head portion at one end of the shaft portion for attaching the spoke to the hub, and a screw-threaded portion at an opposite end of the shaft portion for insertion into a predetermined one of the holes in the rim. The spoke is secured in the rim by a screw-threaded nipple screwed onto the screw threaded end portion of the spoke.

In a preferred embodiment of a hub in accordance with the present invention, the slots in a flange member are elongated and are aligned in a predetermined symmetrical slot pattern corresponding to the spoke lacing pattern of the wheel. A spoke in the spoke lacing pattern may thus be laid into one of the slots with the enlarged head portion thereof located at the closed end of the slot and the threaded end portion thereof directed to a predetermined one of the holes in the rim.

The hub of the present invention avoids the complex operation of spoke threading through spoke holes required of conventional hubs. The slot pattern also provides that spokes are placed in the correct lacing pattern orientation as soon as they are installed in the hub. A machine for building a wheel employing a hub in accordance with the present invention could be significantly simpler in construction and significantly faster in operation than present wheel building machines.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 3 is a fragmentary view partly in section schematically illustrating a spoke suitable for use with the hub of FIG. 1, a spoke, and a section of the rim of FIG. 2.

FIG. 4 is a fragmentary view schematically illustrating detail of spokes laid in slots in the hub of FIG. 1.

FIG. 5 is a cross-section view schematically illustrating details of an empty slot of the hub of FIG. 1 seen generally in the direction 5—5 of FIG. 4.

DETAILED DESCRIPTION OF THE INVENTION

Figure 1:
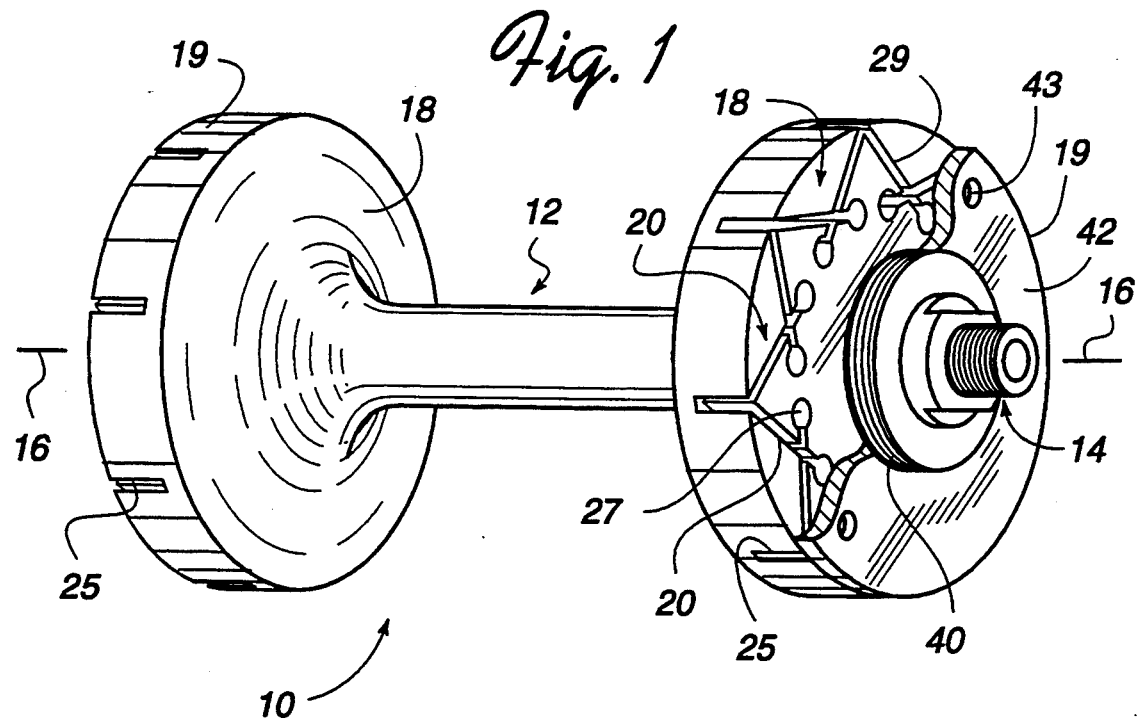
FIG. 1 is a perspective view schematically illustrating one embodiment of a hub in accordance with the present invention

Turning now to the drawings, wherein like components are designated by like reference numerals, FIG. 1 shows one preferred embodiment of a hub 10 in accordance with the present invention. Hub 10 includes an elongated hub body 12. Hub body 12 is rotatable about an axle 14 extending therethrough. Axle 12 defines an axis of rotation 16 for the hub. At each end of hub body 12 is a flange member 18. The flange members are preferably circular and are arranged generally transverse to and concentric with axis of rotation 16 i.e., with axis 16 extending therethrough.

Continuing with reference to FIG. 1, and additionally to FIGS. 2, 3, 4, and 5, each flange member 18 has a plurality of slots 20 therein. Each of slots 20 is for receiving a particular one of a plurality of spokes 22 which attach hub 10 to a rim 24 to form a spoked wheel 26 (see FIG. 2). Each of spokes 22 has an elongated shaft portion 30, an enlarged head portion 32 at one end thereof and a screw-threaded portion 34 at the opposite end thereof (see FIG. 3). When a wheel is built threaded end 34 is inserted through a particular one of a plurality of holes 36 in rim 24.

Each of slots 20 has a base 21 an open top 23, an open end 25 located at periphery 19 of flange member 18 and a closed end 27 located between periphery 19 and axis of rotation 16 (see FIG. 5). As illustrated in particular in FIG. 4, each of slots 20 has a width at a narrowest portion 29 thereof sufficient to receive shaft portion 30 of spoke 22 but not sufficient to receive enlarged head portion 32 thereof. Each of slots 20 has an enlarged portion 31 proximate closed end 27 thereof. Enlarged portion 31 has a width sufficient to receive enlarged head portion 32 of spoke 22. This allows a spoke 22 to be laid, by a wheel builder or a wheel building machine, into a slot 20 via the open top of the slot and be seated in the slot with shaft portion 30 of the spoke in the narrowest portion 29 of the slot and enlarged head portion 32 of the spoke in the enlarged portion 31 of the slot.

In one preferred arrangement enlarged portion 31 of a slot 20 is cylindrical in form. This cylindrical form is convenient for accommodating spoke heads which are spherical, cylindrical or "hammer-headed, or a more traditional oblate-spheroidal shape. Slot 31 may have a sloping base corresponding to the orientation of a spoke in the wheel. Enlarged portion 31 of slot 20 preferably has a base 31A extending below slot base 21 and arranged such that a spoke laid therein may rest on slot base 21. An alternative to providing a slot having a sloping base, a slot 20 may have a flat base and flange member 18 may be slightly "umbrella-shaped" with a cone angle corresponding to the inclination of spokes in a finished wheel. When the pattern of slots in a flange is a pattern of intersecting slots, as will be the case in many for many common spoke lacing patterns, it may be found useful to have intersecting slots of different depths as illustrated by slots 20 designated A and B in FIGS. 4 and 5. This allows an overlapping spoke to rest on a slot base as well as the spoke being overlapped. The base of the shallower slot will of course be interrupted of course in some portion thereof by the intersecting deeper slot. These an other alternatives may be devised by one skilled in the art to which the present invention pertains without departing from the spirit and scope of the invention.

When laid in a slot 20 in as illustrated in FIG. 4, a spoke 22 can not be pulled out of a slot by normal wheel building tension applied in a longitudinal direction of the spoke. Absent any other restraint than spoke tension, however, a spoke may be dislodged from an assembled wheel, for example, wheel 26, by a sufficiently powerful lateral impact which could dislodge a spoke via open top 23 of the slot. In FIG. 1 one device for retaining spokes in slots in an assembled wheel is illustrated. Here, hub 10 is provided with threaded end portions 40 (only one thereof visible in FIG. 1). A retaining ring 42, having a mating thread, is then screwed onto threaded portion 40, effectively closing tops 25 of slots 20 for retaining spokes in the slots in the event of a lateral impact. Retaining ring 42 is provided with holes 43 which enable the ring to be tightened with a peg tool or the like.

It is pointed out here that retaining ring 42 is but one example of spoke retaining means. Those familiar with the art to which the present invention pertains may readily devise other methods, different in arrangement, but similar in principle to threaded portion 40 and retaining ring 42.

Figure 2:
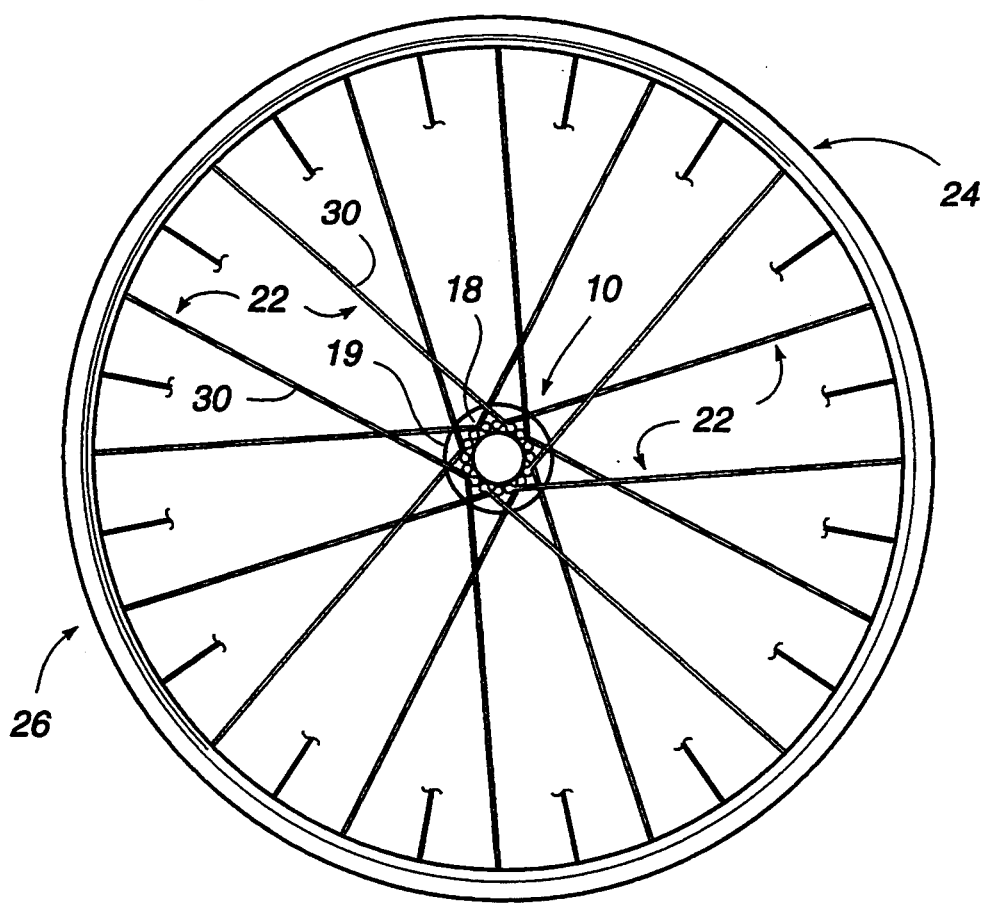
FIG. 2 is an elevation view schematically illustrating a spoked wheel including a rim, a plurality of spokes and the hub of FIG. 1.

The arrangement of spokes in a spoked wheel may be referred to as a spoke lacing pattern. Although, wheels are sometimes built with a simple radial pattern, wherein each of the spokes lies along a diameter of the wheel, and spokes, consequently, do not overlap, most spoked wheels have spokes arranged in a more complex, overlapping lacing pattern. By way of example, the lacing pattern may comprise, twenty-eight, thirty-two, thirty-six, or forty spokes per wheel, arranged such that each spoke in the pattern intersects one, two, three or four other spokes. Half of the spokes in the pattern are attached to each of two hub flange members. For purposes of this description, a common (bicycle wheel) lacing pattern including thirty-six spokes per wheel, arranged such that each spoke overlaps (or underlaps) three other spokes, is selected. Such a pattern is illustrated in FIG. 2 wherein, for simplicity, only those (eighteen) spokes in visible flange 18 member are shown in full.

As discussed above, one problem in building a wheel using prior art hubs is that spokes must be threaded through spoke-holes in a flange before they can be oriented into a particular lacing pattern. As no means for correctly aligning spokes is provided by the spoke-holes in prior art hubs, an additional problem is presented in correctly aligning spokes in a lacing pattern. Both of these problems are solved by a hub in accordance with the present invention. By providing a flange member 18 of sufficient diameter, for example between about five and six centimeters diameter, a slot 20 therein, being one of a predetermined symmetrical pattern of slots corresponding to a predetermined spoke lacing pattern, may be sufficiently elongated that a spoke 22, laid therein, could automatically be aligned with threaded end 36 thereof directed to the correct hole in rim 24, provided, of course, that hub 10 was aligned concentric with rim 24.

Figure 6:
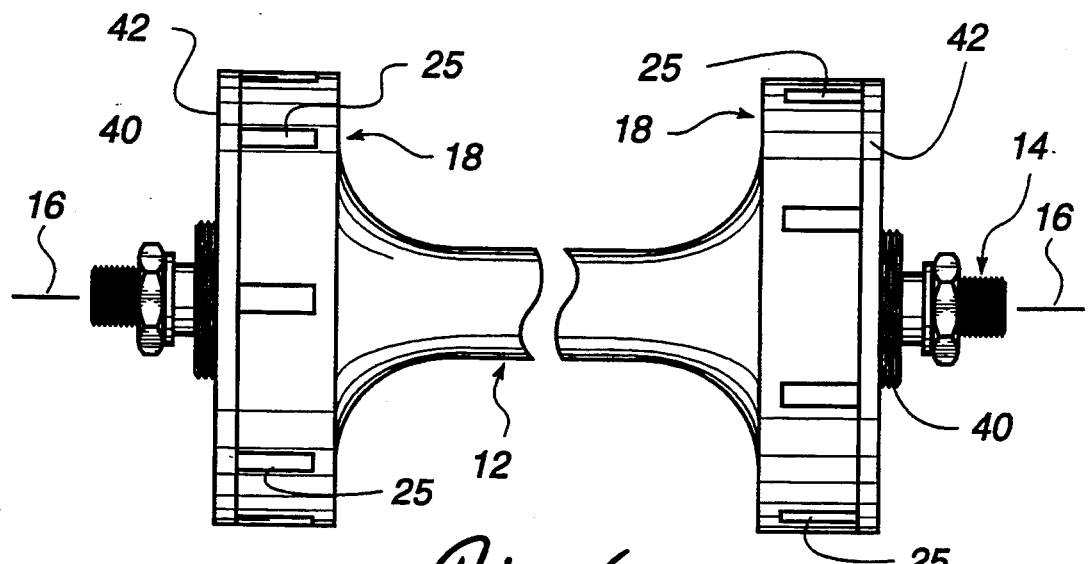
FIG. 6 is a longitudinal elevation view schematically illustrating details of flange members, slots, and retaining rings of the hub of FIG. 1.

Hub 10 is described above in terms of an elongated hub body 12 having fixed flange members 18 at each end thereof. This is illustrated in perspective in FIG. 1 and in longitudinal elevation in FIG. 6. It is pointed out here, for completeness of description, that opposite flange members 18 are arranged such that slot ends 25 of the flange members are rotationally aligned midway between corresponding slot ends in the opposite flange member, such that the slot pattern in one flange is rotationally misaligned (by three-hundred sixty degrees divided by the number of spokes in the pattern) with respect the spoke pattern in the opposite flange. This enables the two halfs of the spoke lacing pattern defined in each flange member to properly mesh. In the thirty-six spoke pattern described herein, the patterns are rotationally misaligned aligned by ten degrees.

Figure 7:
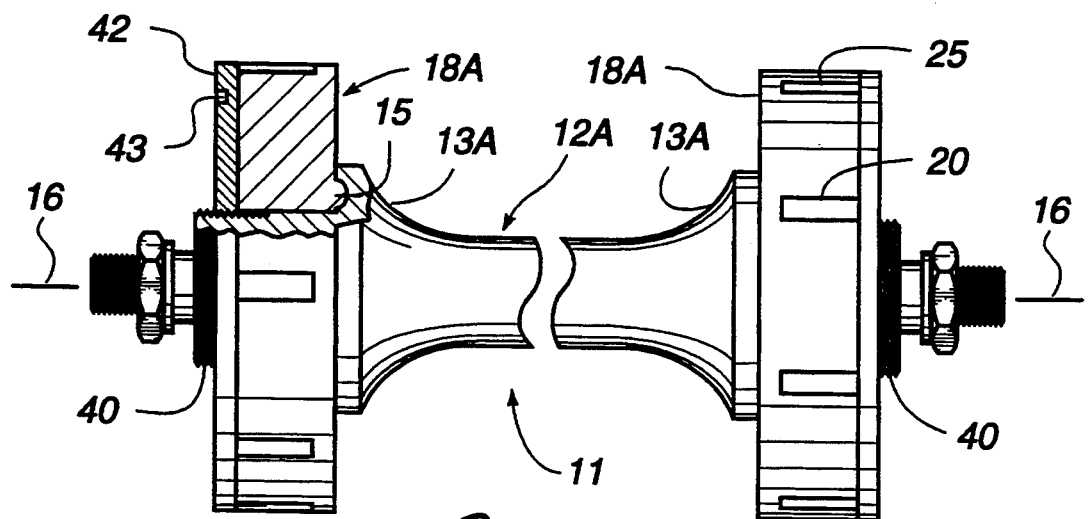
FIG. 7 is a longitudinal elevation view schematically illustrating an alternate arrangement of the hub of FIG. 6 wherein the flange members are removable.
Figure 8:
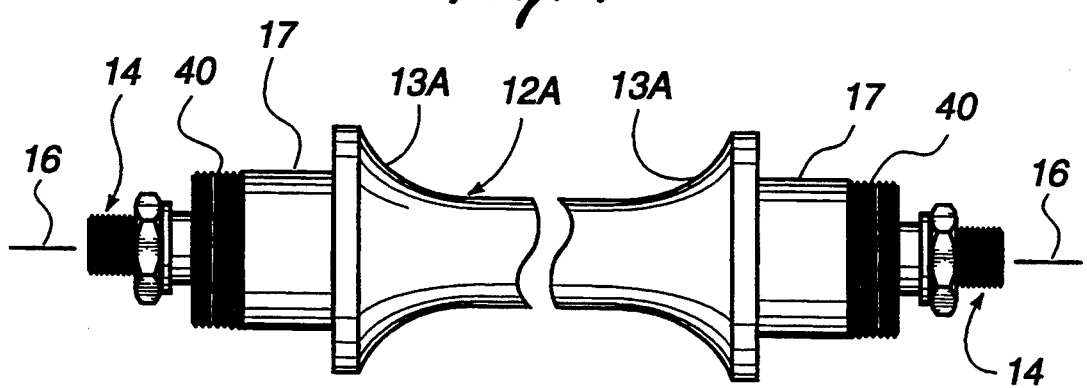
FIG. 8 is a longitudinal elevation view schematically illustrating the hub of FIG. 7 with flange members removed.

Referring now to FIG. 7, in another embodiment of the present invention, a hub 11 includes flange members 18A which are removably attached to a hub body 12A. Flange members 18A are annular and are slidably fitted on mating cylindrical end portions 17 of hub body 12A. Flange member 18A is prevented from rotating about a corresponding end portion 17 by means of a peg 15 engaging a corresponding hole or recess in a diametrically enlarged portion 13A of hub body 12A. Spoke retaining ring 42 here also serves as a convenient means of clamping a removable flange 18A in place on hub body 12A.

An advantage of hub 11 is that a common hub body may be used with different flange members 18A to build wheels having any common spoke lacing pattern. A wheel builder is thus not required to maintain a large expensive inventory of different hubs in order to be build able to build wheels of different lacing patterns.

What is claimed is:

1. A hub for a spoked wheel, the wheel including a hub and a rim attached to each other by a plurality of spokes arranged in a predetermined spoke lacing pattern wherein each of said spokes overlaps at least one other of said spokes, the rim including a plurality of equispaced holes, each thereof for receiving a spoke, each spoke including an elongated shaft portion, an enlarged head portion at one end of the shaft portion for attaching the spoke to the hub, and a screw-threaded portion at an opposite end of the shaft portion for insertion into a predetermined one of the holes in the rim, the hub comprising:

an elongated hub body having an axis of rotation, said hub body having a spoke flange member at each end thereof, and each of the spoke flange members having a circular periphery generally concentric with the axis of rotation;

each spoke flange member including a plurality of elongated slots therein, each of said slots for receiving one of the plurality of spokes, each of said slots having a base, an open top, an open end located at the periphery of the flange member, and a closed end located between the periphery of said spoke flange member and the axis of rotation, each of said slots having a width at a narrowest portion thereof sufficient to receive the shaft portion of the spoke but not sufficient to receive the enlarged head portion of the spoke, and each of said slots having an enlarged portion proximate said closed end thereof, said enlarged portion having a width sufficient to receive said enlarged head portion of the spoke;

said slots in each of said spoke flange members are aligned in a predetermined symmetrical slot pattern with adjacent ones of said slots intersecting in a manner corresponding to the spoke lacing pattern such that one of the spokes in the spoke lacing pattern may be laid into a said slot with the enlarged head portion thereof located in said enlarged portion of the slot and the screw-threaded end portion thereof directed to a predetermined one of the holes in the rim; and a first of said adjacent intersecting slots have a first depth and a second of said intersecting slots having a second depth, said first and second depths arranged such that a first spoke laid in said first slot may overlap a second spoke laid in said second slot while each of said first and second spokes is in contact with a corresponding slot base.

2. The hub of claim 1, wherein said spoke flange members are removably attached to said hub body.

* * * * *